US012793311B2

(12) United States Patent
Wei et al.

(10) Patent No.: US 12,793,311 B2
(45) Date of Patent: Nov. 10, 2026

(54) BLENDSHAPE WEIGHTS PREDICTION FOR FACIAL EXPRESSION OF HMD WEARER USING MACHINE LEARNING MODEL TRAINED ON RENDERED AVATAR TRAINING IMAGES

(71) Applicant: Hewlett-Packard Development Company, L.P., Spring, TX (US)

(72) Inventors: Jishang Wei, Fort Collins, CO (US); Joseph Nouri, Fort Collins, CO (US); Kaden Strand, Fort Collins, CO (US); Rafael Ballagas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 277 days.

(21) Appl. No.: 18/576,628

(22) Filed: Jan. 4, 2024

(65) Prior Publication Data

US 2024/0312095 A1 Sep. 19, 2024

(51) Int. Cl.
*G06T 13/40* (2011.01)
*G06V 10/44* (2022.01)
*G06V 40/16* (2022.01)

(52) U.S. Cl.
CPC .............. *G06T 13/40* (2013.01); *G06V 10/44* (2022.01); *G06V 40/174* (2022.01)

(58) Field of Classification Search
CPC ...... G06T 13/40; G06V 10/44; G06V 40/174; G06N 3/09; G06N 3/0464; H04N 23/90
See application file for complete search history.

(56) References Cited

U.S. PATENT DOCUMENTS

| | | | | |
|---|---|---|---|---|
| 7,643,683 | B2 * | 1/2010 | Miller .................. | G06V 40/172 382/209 |
| 10,970,907 | B1 * | 4/2021 | Albuz .................. | G06V 40/161 |
| 11,410,370 | B1 * | 8/2022 | Ma ....................... | G06V 40/171 |
| 2017/0243387 | A1 | 8/2017 | Li et al. | |

(Continued)

FOREIGN PATENT DOCUMENTS

| | | | |
|---|---|---|---|
| CN | 106600667 | A | 4/2017 |
| WO | 2019/209431 | A1 | 10/2019 |

OTHER PUBLICATIONS

Kuang, C. et al. (2022). AU-Aware 3D Face Reconstruction through Personalized AU-Specific Blendshape Learning. In: Avidan, S. et al. (eds) Computer Vision â ECCV 2022. ECCV 2022. Lecture Notes in Computer Science, vol. 13673. Springer, Cham. (Year: 2022).*

(Continued)

*Primary Examiner* — Said Broome
*Assistant Examiner* — Jordan Wan Yick
(74) *Attorney, Agent, or Firm* — Quarles & Brady LLP

(57) ABSTRACT

Avatar training images of facial avatars having facial expressions corresponding to specified blendshape weights are rendered. A two-stage machine learning model is trained based on the rendered avatar training images and the specified blendshape weights. The machine learning model has a first stage extracting image features from the rendered avatar training images and a second stage predicting blendshape weights from the extracted image features. The trained machine learning model is applied to predict the blendshape weights for a facial expression of a wearer of a head-mountable display (HMD) from a set of images captured by the HMD of a face of the wearer when exhibiting the facial expression.

20 Claims, 11 Drawing Sheets

(56) References Cited

U.S. PATENT DOCUMENTS

| | | | | |
|---|---|---|---|---|
| 2020/0051303 | A1 | 2/2020 | Li et al. | |
| 2021/0166458 | A1 | 6/2021 | Beeler et al. | |
| 2022/0092837 | A1 * | 3/2022 | Sagar | G06V 10/98 |

OTHER PUBLICATIONS

Nojavanasghari, Behnaz, Yuchi Huang, and Saad Khan. “Interactive generative adversarial networks for facial expression generation in dyadic interactions.” (2018). (Year: 2018).*

Nagano, Koki, et al., “paGAN: real-time avatars using dynamic textures”, ACM Trans. Graph. 37.6 (2018): 258-1. ACM Trans. Graph. 2018, Journal Publication, pp. 1-12 [p. 3].

* cited by examiner

BLENDSHAPE WEIGHTS PREDICTION FOR FACIAL EXPRESSION OF HMD WEARER USING MACHINE LEARNING MODEL TRAINED ON RENDERED AVATAR TRAINING IMAGES

BACKGROUND

Extended reality (XR) technologies include virtual reality (VR), augmented reality (AR), and mixed reality (MR) technologies, and quite literally extend the reality that users experience. XR technologies may employ head-mountable displays (HMDs). An HMD is a display device that can be worn on the head. In VR technologies, the HMD wearer is immersed in an entirely virtual world, whereas in AR technologies, the HMD wearer's direct or indirect view of the physical, real-world environment is augmented. In MR, or hybrid reality, technologies, the HMD wearer experiences the merging of real and virtual worlds.

DETAILED DESCRIPTION

Figure 1A:
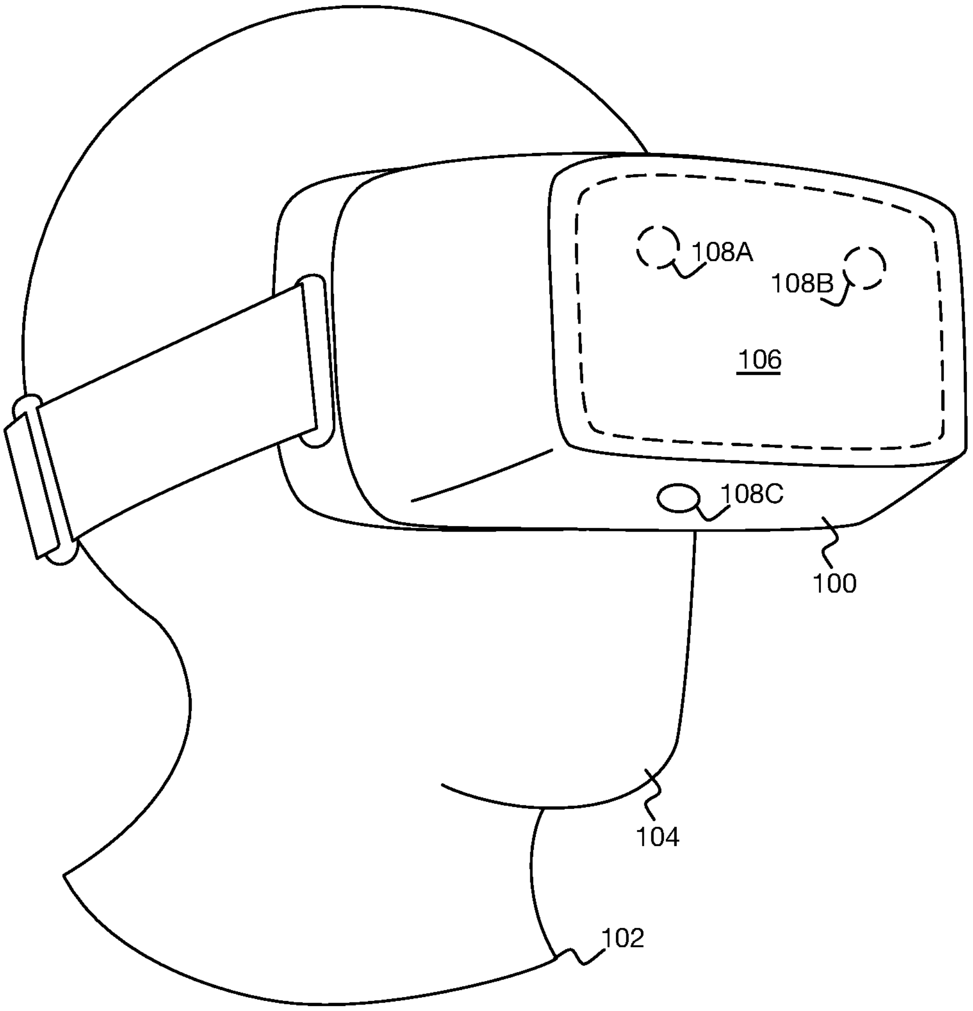
FIGS. 1A and 1B are perspective and front view diagrams, respectively, of an example head-mountable display (HMD) that can be used in an extended reality (XR) environment.

As noted in the background, a head-mountable display (HMD) can be employed as an extended reality (XR) technology to extend the reality experienced by the HMD's wearer. An HMD can include one or multiple small display panels in front of the wearer's eyes, as well as various sensors to detect or sense the wearer and/or the wearer's environment. Images on the display panels convincingly immerse the wearer within an XR environment, be it a virtual reality (VR), augmented reality (AR), a mixed reality (MR), or another type of XR.

An HMD can include one or multiple cameras, which are image-capturing devices that capture still or motion images. For example, one camera of an HMD may be employed to capture images of the wearer's lower face, including the mouth. Two other cameras of the HMD may be each be employed to capture images of a respective eye of the HMD wearer and a portion of the wearer's face surrounding the eye.

In some XR applications, the wearer of an HMD can be represented within the XR environment by an avatar. An avatar is a graphical representation of the wearer or the wearer's persona, may be in three-dimensional (3D) form, and may have varying degrees of realism, from cartoonish to nearly lifelike. For example, if the HMD wearer is participating in an XR environment with other users wearing their own HMDs, the avatar representing the HMD wearer may be displayed on the HMDs of these other users.

The avatar may be a facial avatar, in that the avatar has a face corresponding to the face of the wearer of the HMD. To more realistically represent the HMD wearer, the facial avatar may have a facial expression in correspondence with the wearer's facial expression. The facial expression of the HMD wearer thus has to be determined before the facial avatar can be rendered to exhibit the same facial expression.

A facial expression can be defined by a set of blendshape weights of a facial action coding system (FACS). A FACS taxonomizes human facial movements by their appearance on the face, via values, or weights, for different blendshapes. Blendshapes may also be referred to as facial action units and/or descriptors, and the values or weights may also be referred to as intensities. Individual blendshapes can correspond to particular contractions or relaxations of one or more muscles, for instance. Any anatomically possible facial expression can thus be deconstructed into or coded as a set of blendshape weights representing the facial expression. It is noted that in some instances, facial expressions can be defined using blendshapes that are not specified by the FACS.

Facial avatars can be rendered to have a particular facial expression based on the blendshape weights of that facial expression. That is, specifying the blendshape weights for a particular facial expression allows for a facial avatar to be rendered that has the facial expression in question. This means that if the blendshape weights of the wearer of an HMD are able to be identified, a facial avatar exhibiting the same facial expression as the HMD wearer can be rendered and displayed.

One way to identify the blendshape weights of the wearer of an HMD is to employ a machine learning model that predicts the blendshape weights of the wearer's current facial expression from facial images of the wearer that have been captured by the HMD. However, training such a blendshape weights prediction model is difficult. Experts or other users may have to manually code thousands or more HMD-captured training images of different HMD wearers exhibiting different facial expressions with accurate blendshape weights.

Such a process is time consuming at best, and unlikely to yield accurate training data at worst. Since the accuracy of the machine learning model may depend on the quantity and diversity of the training data, acquiring large numbers of different HMD-captured training images of actual HMD wearers exhibiting different facial expressions can be paramount even if necessitating significant time and effort. Once the training images have been acquired, they then still have to be painstakingly manually coded with their constituent blendshape weights, which is to some degree a subjective process open to interpretation and thus affecting the quality or accuracy of the training data.

Techniques described herein provide for the prediction of blendshape weights for facial expressions of HMD wearers using a machine learning model that is trained on rendered avatar training images. That is, rather than (or in addition to) training the blendshape weights prediction model using HMD-captured training images of actual HMD wearers that may have been laboriously acquired and painstakingly labeled with blendshape weights, the described techniques train the model using (at least) training images of rendered facial avatars. Such rendered facial avatar training images are more quickly generated, and are generated from specified blendshape weights. Therefore, the training images do not have to be manually labeled with blendshape weights.

As noted, for instance, a facial avatar can be rendered to exhibit a particular facial expression from the blendshape weights for that facial expression. Simulated HMD-captured training images of such facial avatars can thus be generated and used to train the blendshape weights prediction model. Because the blendshape weights of each avatar training image are specified for a specific rendering of the facial avatar in question, no manual labeling or other coding of the weights is necessary.

Figure 1B:
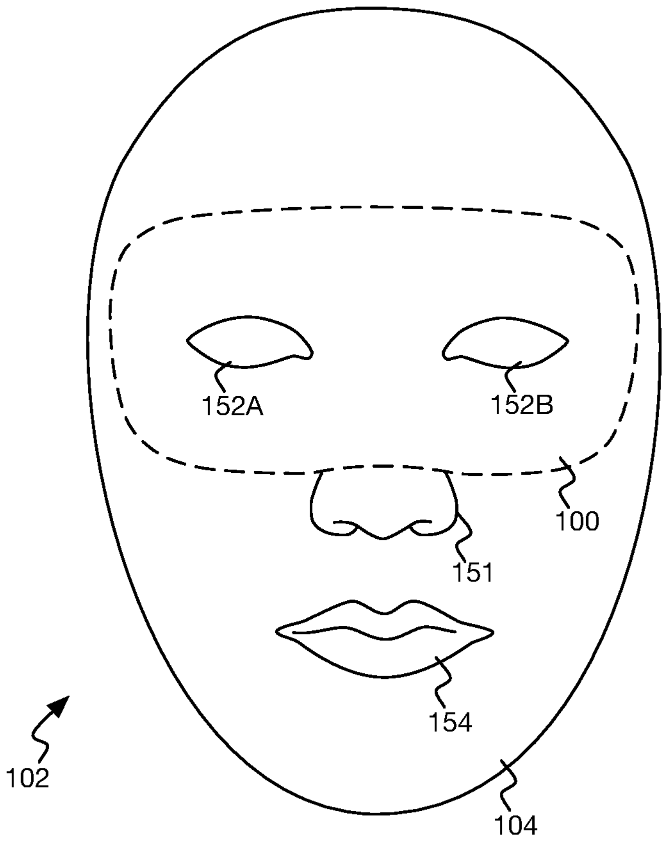

FIGS. 1A and 1B show perspective and front view diagrams of an example HMD 100 worn by a wearer 102 and positioned against the face 104 of the wearer 102 at one end of the HMD 100. Specifically, the HMD 100 can be positioned above the wearer 102's nose 151 and around his or her right and left eyes 152A and 152B, collectively referred to as the eyes 152 (per FIG. 1B). The HMD 100 can include a display panel 106 inside the other end of the HMD 100 that is positionable incident to the eyes 152 of the wearer 102. The display panel 106 may in actuality include a right display panel incident to and viewable by the wearer 102's right eye 152A, and a left display panel incident to and viewable by the wearer 102's left eye 152B. By suitably displaying images on the display panel 106, the HMD 100 can immerse the wearer 102 within an XR.

The HMD 100 can include eye camera 108A and 108B and/or a mouth camera 108C, which are collectively referred to as the cameras 108C. While just one mouth camera 108C is shown, there may be multiple mouth cameras 108C. Similarly, whereas just one eye camera 108A and one eye camera 108B are shown, there may be multiple eye cameras 108A and/or multiple eye cameras 108B. The cameras 108 capture images of different portions of the face 104 of the wearer 102 of the HMD 100, on which basis the blendshape weights for the facial expression of the wearer 102 can be predicted.

The eye cameras 108A and 108B are inside the HMD 100 and are directed towards respective eyes 152. The right eye camera 108A captures images of the facial portion including and around the wearer 102's right eye 152A, whereas the left eye camera 108B captures images of the facial portion including and around the wearer 102's left eye 152B. The mouth camera 108C is exposed at the outside of the HMD 100, and is directed towards the mouth 154 of the wearer 102 (per FIG. 1B) to capture images of a lower facial portion including and around the wearer 102's mouth 154.

Figure 2:
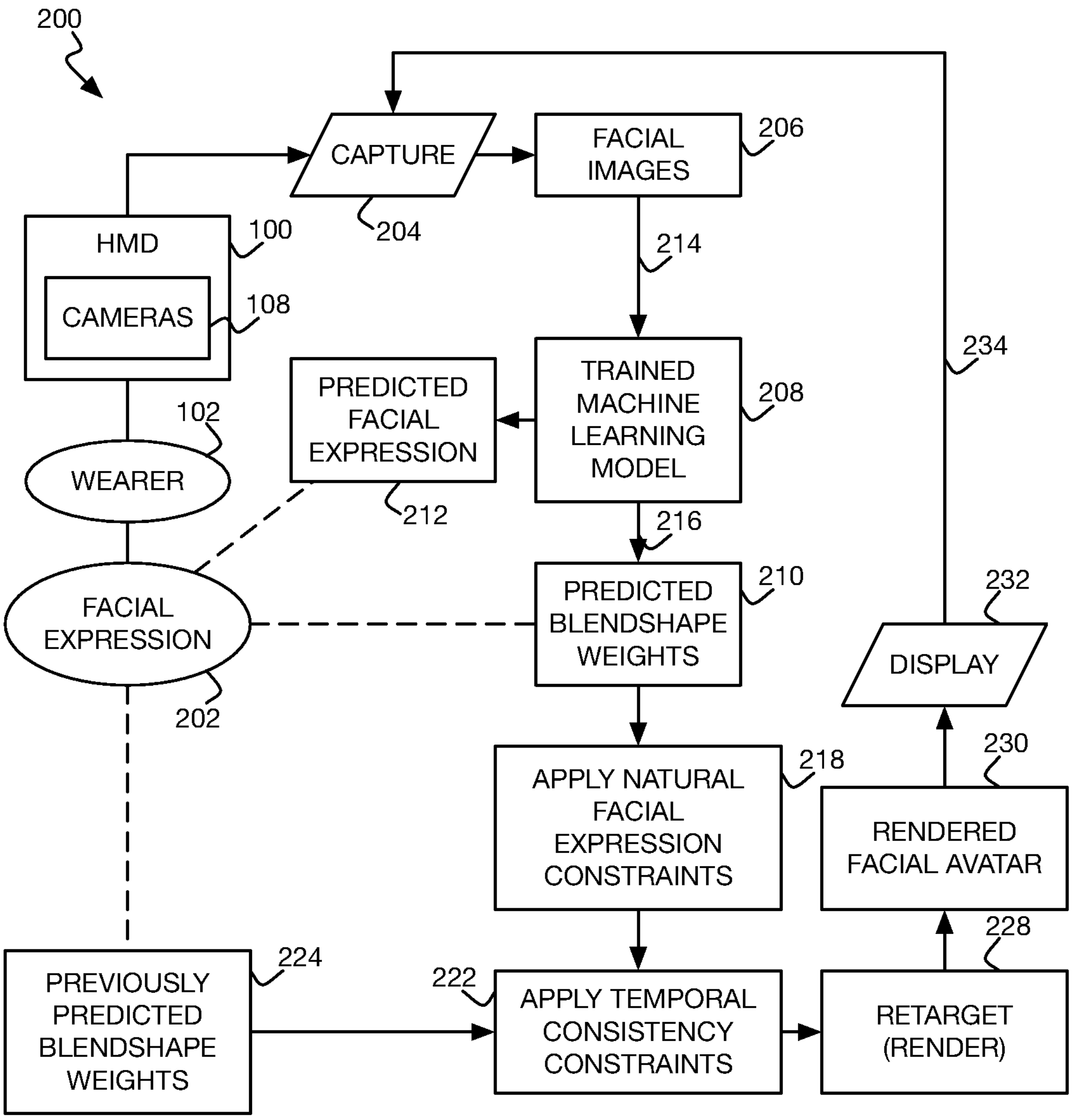
FIG. 2 is a diagram of an example process for predicting blendshape weights for a facial expression of the wearer of an HMD from facial images of the wearer captured by the HMD, on which basis a facial avatar with the wearer's facial expression can be rendered.

FIG. 2 shows an example process 200 for predicting blendshape weights for the facial expression of the wearer 102 of the HMD 100, which can then be retargeted onto a facial avatar corresponding to the wearer 102's face to render the facial avatar with a corresponding facial expression. The cameras 108 of the HMD 100 capture (204) a set of facial images 206 of the wearer 102 of the HMD 100 (i.e., a set of images 206 of the wearer 102's face 104), who is currently exhibiting a given facial expression 202. A trained machine learning model 208 is applied to the facial images 206 to predict blendshape weights 210 for the wearer 102's facial expression 202.

That is, the set of facial images 206 is input (214) into the trained machine learning model 208, with the model 208 then outputting (216) predicted blendshape weights 210 for the facial expression 202 of the wearer 102 based on the facial images 206. The trained machine learning model 208 may also output a predicted facial expression 212 based on the facial images 206, which corresponds to the wearer 102's actual currently exhibited facial expression 202. Specific details regarding the machine learning model 208 and how the model 208 can be trained are provided later in the detailed description.

In one implementation, natural facial expression constraints may then be applied to the predicted blendshape weights 210 (218). Application of the natural facial expression constraints ensure that the predicted blendshape weights 210 do not correspond to an unnatural facial expression unlikely to be exhibitable by any HMD wearer, including the wearer 102. The natural facial expression constraints may be encoded in a series of heuristic-based rules or as a probabilistic graphical model that can be applied to the actual predicted blendshape weights. The natural facial expression constraints, in other words, ensure that the predicted blendshape weights do not correspond to a facial anatomy that is likely to be impossible for the face of any HMD wearer to have in actuality.

In one implementation, temporal consistency constraints may then also be applied (222) to the predicted blendshape weights 210. The temporal consistency constraints are applied to the blendshape weights 210 that have been currently predicted in comparison to previously predicted blendshape weights 224 to ensure that the blendshape weights 210 do not correspond to an unnatural change in facial expression unlikely to be exhibitable by any HMD wearer, including the wearer 102. The temporal consistency constraints may be encoded using a heuristic technique, such as an exponential interpolation-based history prediction technique.

For instance, the blendshape weights 210 of the HMD wearer 102 may be predicted a number of times, continuously over time, from different sets of facial images 206 respectively captured by the cameras 108 of the HMD 100. Each time the blendshape weights 210 are predicted from a set of facial images 206, the natural facial expression constraints may be applied. Further, each time the blendshape weights 210 are predicted, the temporal consistency constraints may be applied to ensure that the currently predicted blendshape weights 210 do not represent an unrealistic if not impossible sudden change in facial anatomy of any HMD wearer in actuality, as compared to the previously predicted blendshape weights 224 for the wearer 102.

Therefore, application of the natural facial expression constraints and the temporal consistency constraints ensures that the blendshape weights 224 more accurately reflect the actual facial expression 202 of the HMD wearer 102. The natural facial expression constraints consider just the currently predicted blendshape weights 210, and not any previously predicted blendshape weights 224. By comparison, the temporal consistency weights consider the currently predicted blendshape weights 210 in comparison to previously predicted blendshape weights 224.

The predicted blendshape weights 210 for the facial expression 202 of the wearer 102 of the HMD 100 can then be retargeted (228) onto a facial avatar corresponding to the face 104 of the wearer 102 to render the facial avatar with this facial expression 202. (The natural facial expression and/or the temporary consistency constraints are thus applied prior to retargeting.) The result of blendshape weight retargeting is thus a rendered facial avatar 230 for the wearer 102. The facial avatar 230 has the same facial expression 202 as the wearer 102 insofar as the predicted blendshape weights 210 accurately reflect the wearer 102's facial expression 202. The facial avatar 230 is rendered from the predicted blendshape weights 210 in this respect, and thus has a facial expression corresponding to the blendshape weights 210.

The facial avatar 230 for the wearer 102 of the HMD 100 may then be displayed (232). For example, the facial avatar 230 may be displayed on the HMDs worn by other users who are participating in the same XR environment as the wearer 102. If the blendshape weights 210 are predicted by the HMD 100 or by a host device, such as a desktop or laptop computer, to which the HMD 100 is communicatively coupled, the HMD 100 or host device may thus transmit the rendered facial avatar 230 to the HMDs or host devices of the other users participating in the XR environment. In another implementation, however, the HMD 100 may itself display the facial avatar 230. The process 200 can then be repeated with capture (204) of the next set of facial images 206 (234)

Figure 3A:
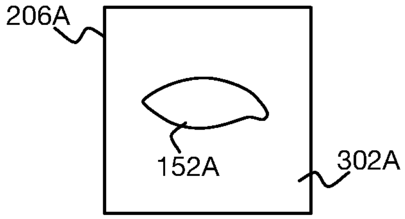
FIGS. 3A, 3B, and 3C are diagrams of example facial images of the wearer of an HMD captured by the HMD, on which basis blendshape weights for the wearer's facial expression can be predicted.
Figure 3B:
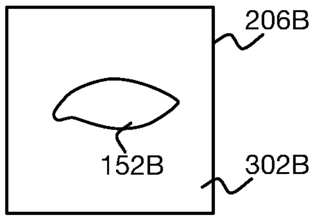
Figure 3C:
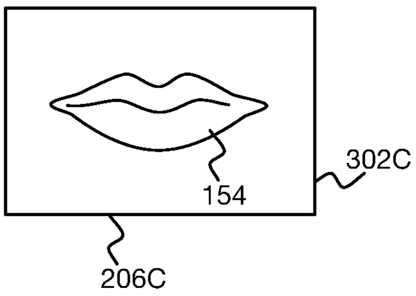

FIGS. 3A, 3B, and 3C show an example set of HMD-captured images 206A, 206B, and 206C, respectively, which are collectively referred to as and can constitute the images 206 to which the trained machine learning model 208 is applied to generate predicted blendshape weights 210. The image 206A is of a facial portion 302A including and surrounding the wearer 102's right eye 152A, whereas the image 206B is of a facial portion 302B including and surrounding the wearer 102's left eye 152B. The image 206C is of a lower facial portion 302C including and surrounding the wearer 102's mouth 154. FIGS. 3A, 3B, and 3C thus show examples of the types of images that can constitute the set of facial images 206 used to predict the blendshape weights 210.

Figure 4:
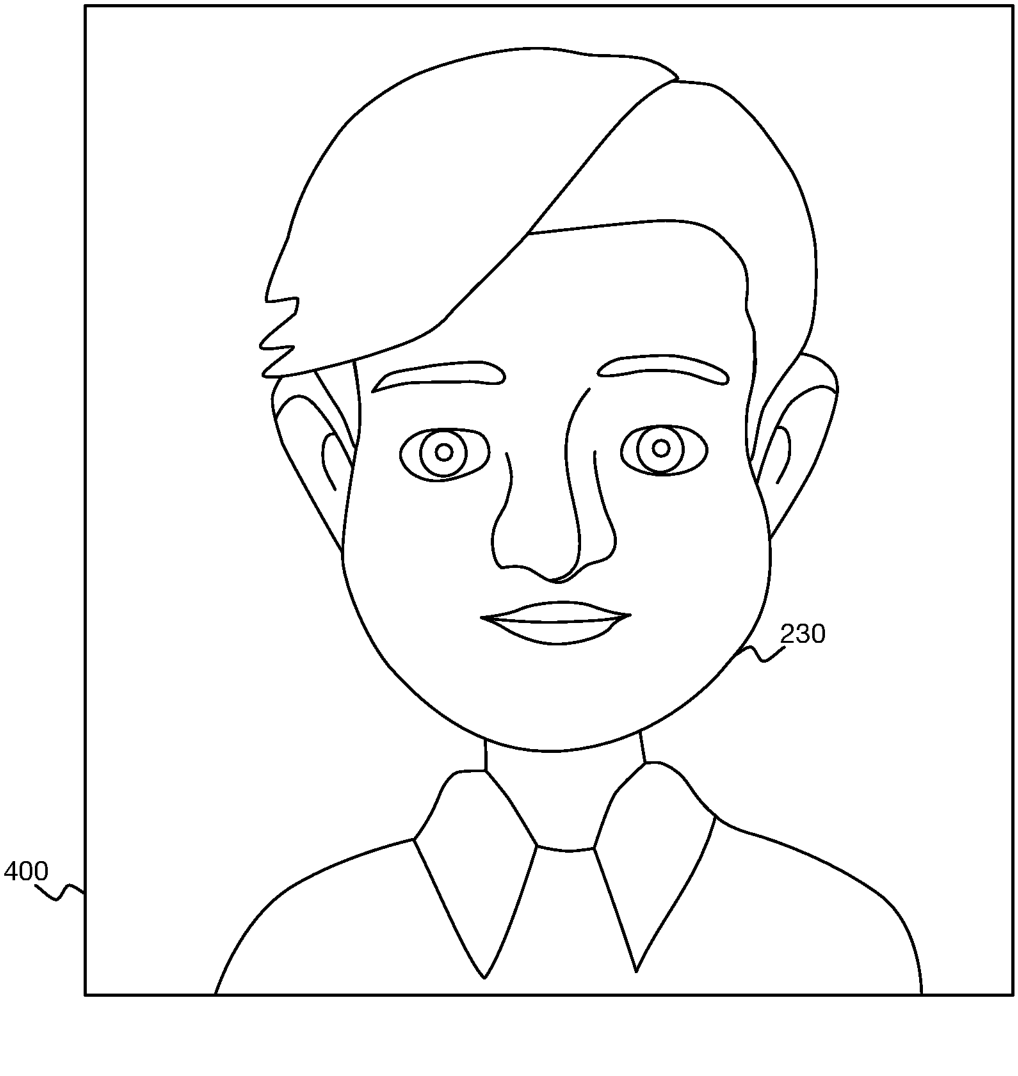
FIG. 4 is a diagram of an example facial avatar that can be rendered to have the facial expression of the wearer of an HMD based on blendshape weights predicted for the wearer's facial expression.

FIG. 4 shows an example image 400 of a facial avatar 230 that can be rendered when retargeting the predicted blendshape weights 210 onto the facial avatar 230. In the example, the facial avatar 230 is a two-dimensional (2D) avatar, but it can also be a 3D avatar. The facial avatar 230 is rendered from the predicted blendshape weights 210 for the wearer 102's facial expression 202. Therefore, to the extent that the predicted blendshape weights 210 accurately encode the facial expression 202 of the wearer 102, the facial avatar 230 has the same facial expression 202 as the wearer 102.

Figure 5:
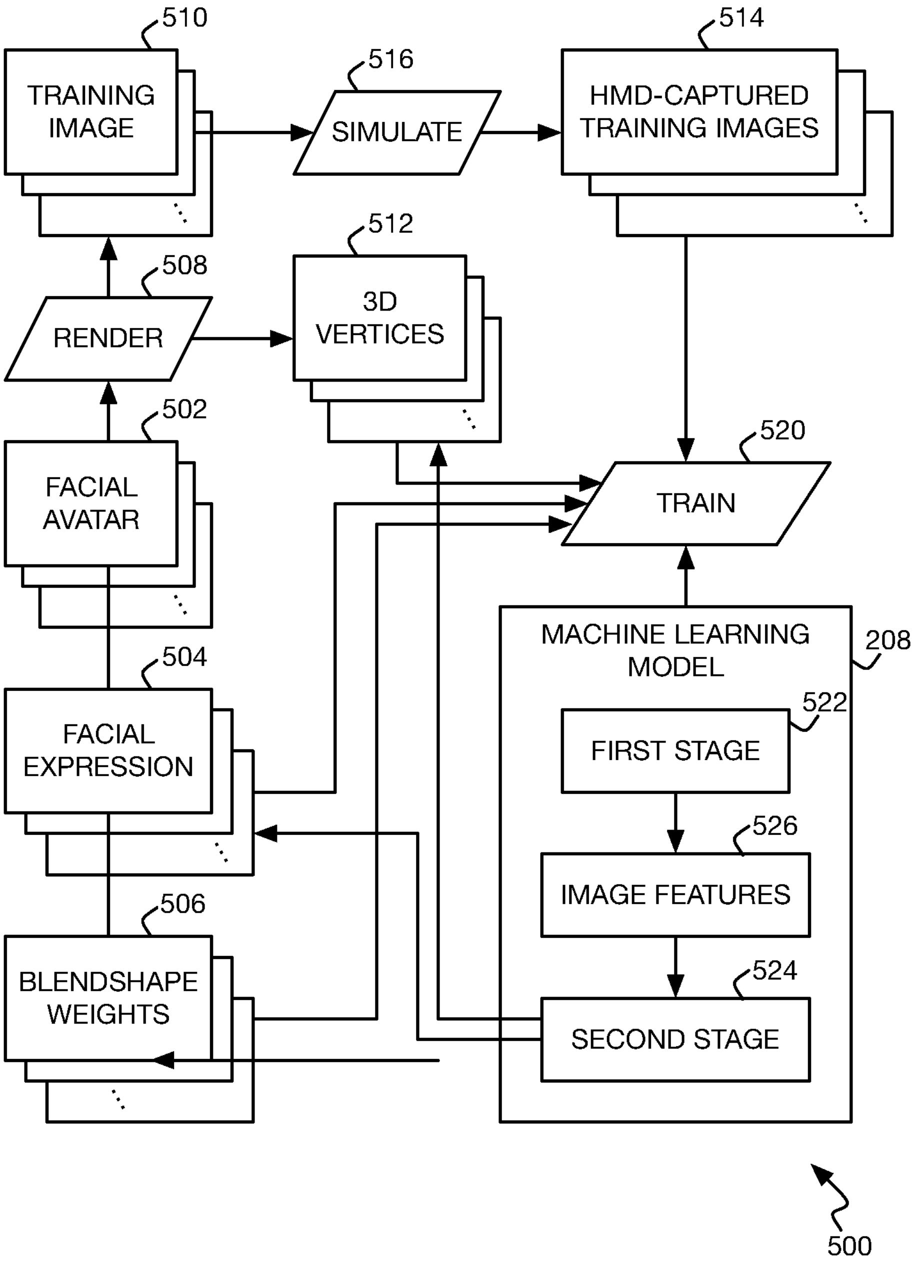
FIG. 5 is a diagram of an example process for training a two-stage machine learning model that can be used to predict blendshape weights in FIG. 2, where the model is trained using training images of rendered facial avatars having facial expressions corresponding to specified blendshape weights.

FIG. 5 shows an example process 500 for training the machine learning model 208 that can be used to predict blendshape weights 210 from HMD-captured facial images 206 of the wearer 102 of the HMD 100. Different facial avatars 502 having different facial expressions 504 at different specified blendshape weights 506 are rendered (508), to yield corresponding avatar training images 510. The facial avatars 502 are rendered in 3D, resulting in a set of 3D vertices 512 for each avatar 502 that can serve as a proxy for muscle and bone movement resulting from the avatar 502 having the facial expression 504 at the specified blendshape weights 506 in question. The rendering of the facial avatars 502 can also yield other information as well. For instance, such other information can include per-pixel depth and/or disparity values and per-pixel 3D motion vectors.

Rendering of a facial avatar 502 based on specified blendshape weights 506 results in the avatar 502 exhibiting the facial expression 504 having or corresponding to these blendshape weights 506. Therefore, the resulting training image 510 of the facial avatar 502 is known to correspond to the specified blendshape weights 506, since the avatar 502 was rendered based on the blendshape weights 506. This means that manual labeling of the training images 510 with blendshape weights 506 is unnecessary, because the images 510 have known blendshape weights 506 due to their facial avatars 502 having been rendered based on the blendshape weights 506.

For each avatar training image 510 of a facial avatar 502, a set of HMD-captured avatar training images 514 can be simulated (516). The HMD-captured training images 514 for a training image 510 simulate how an actual HMD, such as the HMD 100, would capture the face of the avatar 502 if the avatar 502 were a real person wearing the HMD 100. The simulated HMD-captured training images 514 can thus correspond to actual HMD-captured facial images 206 of an actual HMD wearer 102 in that the images 514 can be roughly of the same size and resolution as and can include comparable or corresponding facial portions to those of the actual images 206.

The machine learning model 208 is then trained (520) based on the simulated HMD-captured avatar training images 514 (i.e., more generally the avatar training images 510) and the blendshape weights 506 on which basis the training images 510 were rendered. The model 208 is trained so that it accurately predicts the blendshape weights 506 from the simulated HMD-captured training images 514. The machine learning model 208 may also be trained based on the facial expressions 504 having the constituent blendshape weights 506 if labeled, provided, or otherwise known, and/or based on the 3D vertices 512. The model 208 may be trained in this respect so that it also can accurately predict the facial expressions 504 and/or the 3D vertices 512 from the simulated HMD-captured training images 514. The model 208 may additionally be trained on the basis of any other information that may have been generated during avatar rendering, such as per-pixel depth and/or disparity values and per-pixel 3D motion vectors as noted above, in which case the model 208 can also be trained to predict such information.

The machine learning model 208 is specifically a two-stage model having a first stage 522 and a second stage 524. The first stage 522 may be a backbone network, such as a convolutional neural network, and extracts image features 526 from the simulated HMD-captured avatar training images 514. The second stage 524 may include different head models to respectively predict the blendshape weights 506, the facial expression 504, and the 3D vertices 512 from the extracted image features 526. For instance, there may be one convolutional neural network to predict the blendshape weights 506 from the extracted image features 526, another to predict the facial expression 504 from the image features 526, and a third to predict the 3D vertices 512 from the features 526.

The first and second stages 522 and 524 of the machine learning model 208 are trained in unison. That is, the first stage 522 is trained so that it extracts image features 526 on which basis the second stage 524 can accurately predict blendshape weights 506, facial expression 504, and 3D vertices 512. Whereas the machine learning model 208 is specifically used in FIG. 2 to predict blendshape weights 210 for retargeting onto a facial avatar 230 corresponding to the HMD wearer 102, also training the model 208 for facial expression prediction and 3D vertices prediction is beneficial for at least two reasons.

First, facial expression prediction and/or 3D vertices prediction may be useful in different XR environments. For example, as to the prediction of facial expression 212 in FIG. 2, the predicted facial expression 212 of the wearer 102 of the HMD 100 may be employed for emotional inference and other purposes. 3D vertices prediction may assist with rendering of the facial avatar 230 on the basis of the predicted blendshape weights 210 in some implementations.

However, second, training the machine learning model 208 to predict facial expression 504 and 3D vertices 512 as well as blendshape weights 506 can result in a more accurate model for predicting blendshape weights 506. Facial expression 504 and 3D vertices 512 are additional information regarding the rendered facial avatars 502. Therefore, to the extent that the machine learning model 208 has to be trained to accurately predict a particular facial expression 504 and particular 3D vertices 512 as well as particular blendshape weights 506 for a specific avatar training image 510 (and not just the particular blendshape weights 506 for the image 510), the resulting trained model 208 is that much more accurate. For instance, the first stage 522 may be specifically trained so that it extracts image features 526 in such a way that the second stage 524 can accurately predict blendshape weights 506, facial expression 504, and 3D vertices 512 on the basis of the extracted image features 526.

Figure 6:
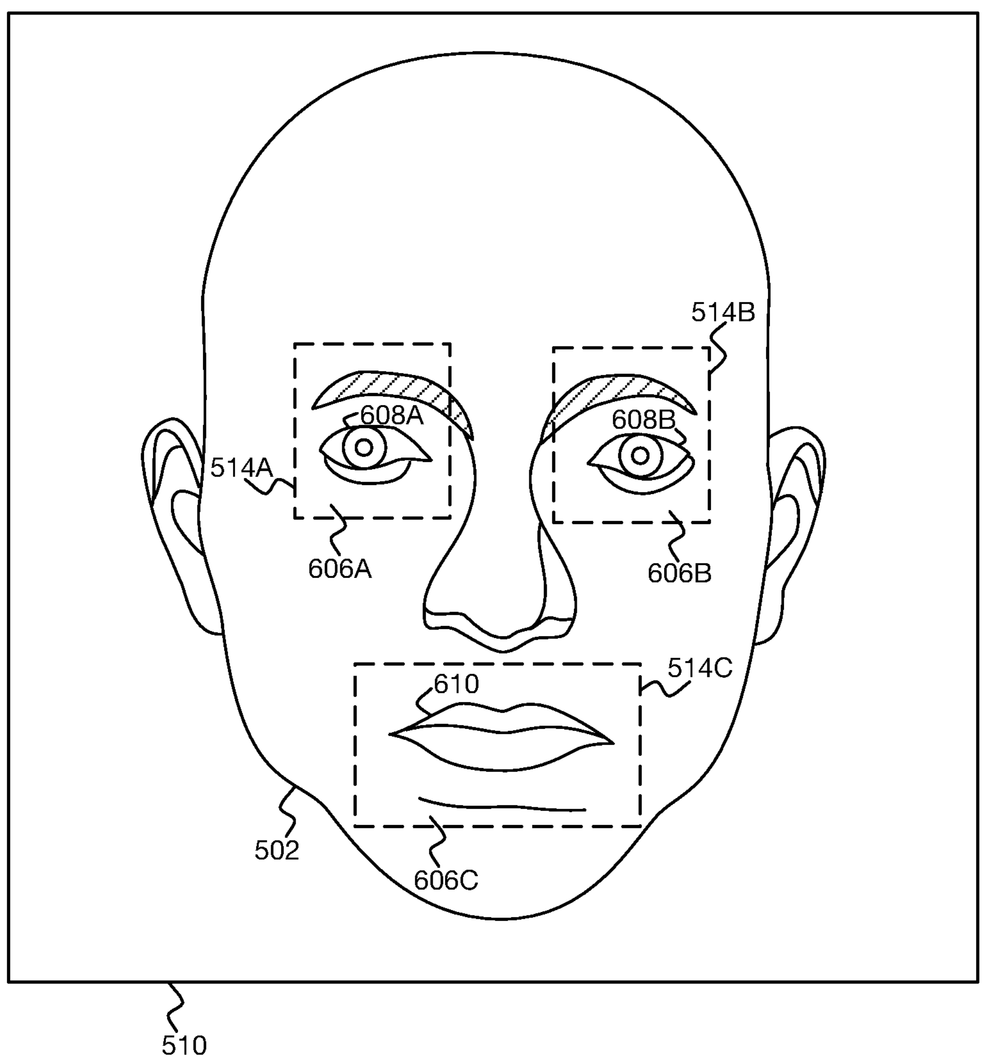
FIG. 6 is a diagram of example simulated HMD-captured training images of a rendered facial avatar, on which basis a two-stage machine learning model for predicting blendshape weights can be trained.

FIG. 6 shows an example avatar training image 510 of a facial avatar 502. The facial avatar 502 is a 3D avatar, and the more lifelike the avatar 502 is, the more accurate the resultantly trained machine learning model 208 will be. FIG. 6 also shows example HMD-captured avatar training images 514A, 514B, and 514C that are simulated from the training image 510 and that can be collectively referred to as the simulated HMD-captured training avatar images 514 on which basis the machine learning model 208 can be actually trained.

The simulated HMD-captured training image 514A is of a facial portion 606A surrounding and including the avatar 502's left eye 608A, whereas the image 514B is of a facial portion 606B surrounding and including the avatar 502's right eye 608B. The training images 514A and 514B are thus left and right eye avatar training images that are simulated in correspondence with actual left and right eye images that can be captured by an HMD, such as the images 206A and 206B of FIGS. 3A and 3B, respectively. That is, the training images 514A and 514B may be of the same size and resolution and capture the same facial portions as actual HMD-captured left and right eye images.

The simulated HMD-captured training image 514C is of a lower facial portion 606C surrounding and including the avatar 502's mouth 610. The training image 514C is thus a mouth avatar training image that is simulated in correspondence with an actual mouth image captured by an HMD, such as the image 206C of FIG. 3C. Similarly, then, the training image 514C may be of the same size and resolution and capture the same facial portion as an actual HMD-captured mouth image. FIG. 6 thus shows an avatar training image 510, as opposed to a training image of an actual HMD wearer, for training the machine learning model 208.

In general, the avatar training images 510 match the perspective and image characteristics of the facial images of HMD wearers captured by the actual cameras of the HMDs on which basis the machine learning model 208 will be used to predict the wearers' facial expressions. That is, the avatar training images 510 are in effect captured by virtual cameras corresponding to the actual HMD cameras. The avatar training images 514 of FIG. 6 that have been described reflect just one particular placement of such virtual cameras. More generally, then, depending on the actual HMD cameras used to predict facial expressions of HMD wearers, the avatar training images 510 can vary in number and placement.

For example, the HMD mouth cameras may be stereo cameras so that more of the wearers' cheeks may be included within the correspondingly captured facial images, in which case the avatar training images 510 corresponding to such facial images would likewise capture more of the rendered avatars' cheeks. As another example, the HMD cameras may also include forehead cameras to capture facial images of the wearers' foreheads, in which case the avatar training images 510 would include corresponding images of the rendered avatars' foreheads. As a third example, there may be multiple eye cameras to capture the regions surrounding the wearers' eyes at different oblique angles, in which case the avatar training images 510 would also include corresponding such images.

As noted, using avatar training images 510 to train the machine learning model 208 can provide for faster and more accurate training. First, unlike training images of actual HMD wearers, large numbers of avatar training images 510 can be more easily acquired. Second, unlike training images of actual HMD wearers, such avatar training images 510 do not have to be manually labeled with blendshape weights 506, since the training images 510 are rendered from specified and thus already known blendshape weights 506. The rendered avatar training images 510 may also be used for acquiring HMD wearer training images, as an additional basis on which the machine learning model 208 can be trained, without having to manually label the HMD wearer training images.

Figure 7:
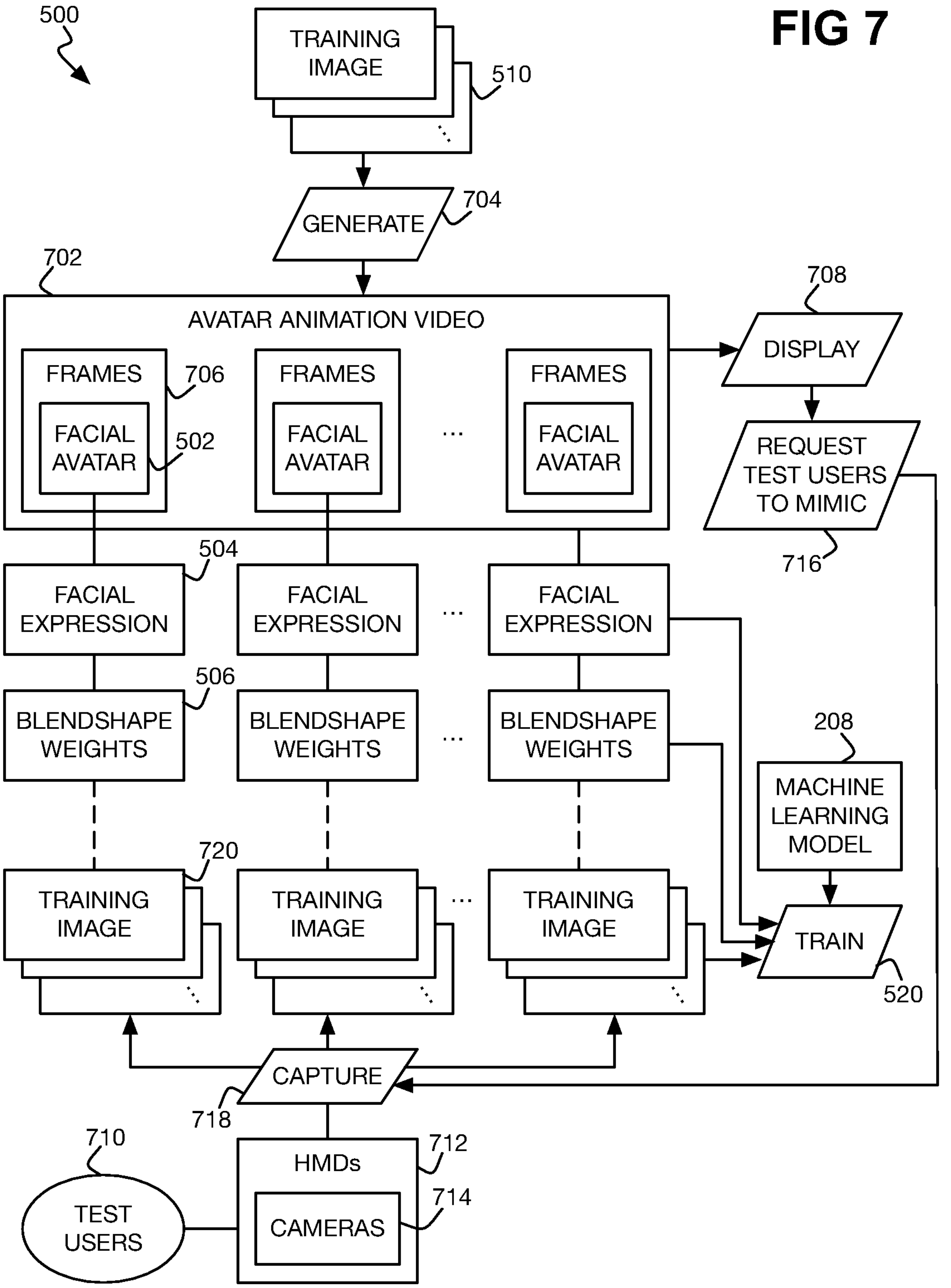
FIG. 7 is a diagram of the example machine learning model-training process of FIG. 5 in which the model is also trained using HMD-captured training images of test users mimicking facial expressions of rendered facial avatars corresponding to specified blendshape weights.

FIG. 7 shows the example process 500 as extended in such a manner. From the avatar training images 510, an avatar animation video 702 is generated (704). The avatar animation video 702 includes consecutive groups of frames 706 of the facial avatars 502 having the facial expressions 504 at the specified blendshape weights 506. That is, the video 702 sequentially includes the facial avatars 502 of the avatar training images 510. In the video 702, each avatar 502 (and thus each facial expression 504) is displayed for a length of time, within a number of video frames. The avatar animation video 702 therefore can animate the same or different avatar 502 as different facial expressions 504 are being exhibited.

The avatar animation video 702 is displayed (708) to test users 710 wearing HMDs 712 having cameras 714, which may correspond to the cameras 108 of the HMD 100 that has been described. The test users 710 are requested (716) to mimic the facial expressions 504 of the facial avatars 502 as the facial expressions 504 are displayed within the video 702. As the facial expressions 504 within the avatar animation video 702 are displayed—and thus as the test users 710 are mimicking the displayed facial expressions 504—the cameras 714 of the HMDs 712 capture (718) test user facial training images 720 of the test users 710 wearing the HMDs 712.

Each such set of test user facial training images 720 may be similar to the images 206A, 206B, and 206C of respective FIGS. 3A, 3B, and 3C, for instance. Thus, each set of test user facial training images 720 can include test user left and right eye test user training images, captured by an HMD worn by a test user, of the facial portions respectively including the test user's left and right eyes. Each set of test user facial training images 720 can similarly include a mouth test user training image, captured by the HMD, of the lower facial portion including the test user's mouth.

Because the facial expressions 504 that the test users 710 are mimicking within the test user facial training images 720 are known (i.e., which facial avatar 502 and thus which facial expression 504 is being displayed at each particular time is known), the blendshape weights 506 to which the training images 720 correspond is known. The blendshape weights 506 to which a set of training images 720 corresponds are the blendshape weights 506 for the facial expression 504 of the facial avatar 502 that was displayed to the test user 710 in question when the set of training images 720 was captured while the test user 710 was mimicking the facial expression 504. Therefore, the test user facial training images 720 do not have to be manually labeled with blendshape weights 506. Rather, the avatar training images 510 are leveraged to also acquire the training images 720 of actual test users 710.

The machine learning model 208 is then trained (520) as in FIG. 5. The machine learning model 208 is trained to accurately predict blendshape weights 506, and facial expressions 504 if labeled or otherwise known, for the test user facial training images 720 in addition to for the avatar training images 510. Such additional training data can result in a more accurately trained machine learning model 208. The avatar training images 510 may provide for training data in which the facial expressions 504 exactly correspond to blendshape weights 506 in that the facial avatars 502 are generated based on specified such blendshape weights 506. By comparison, the test user facial training images 720 can provide for training data that is of actual HMD wearers and thus can compensate for any lack in realism in how the avatars 502 actually represent real people.

For increased accuracy of the machine learning model 208, the model 208 can be trained in such a way so that it does not distinguish between avatars and actual HMD wearers. That is, for a given set of images, the machine learning model 208 should predict blendshape weights regardless of whether the images are of an avatar or an actual HMD wearer. To this end, the first stage 522 of the machine learning model 208 may be trained so that its resultantly extracted image features 526 do not permit distinguishing an avatar from an actual HMD wearer (and vice-versa) within the images to which the model 208 is applied. The machine learning model 208 may therefore be trained using an adversarial training technique to provide the model 208 with robustness in this respect.

Figure 8:
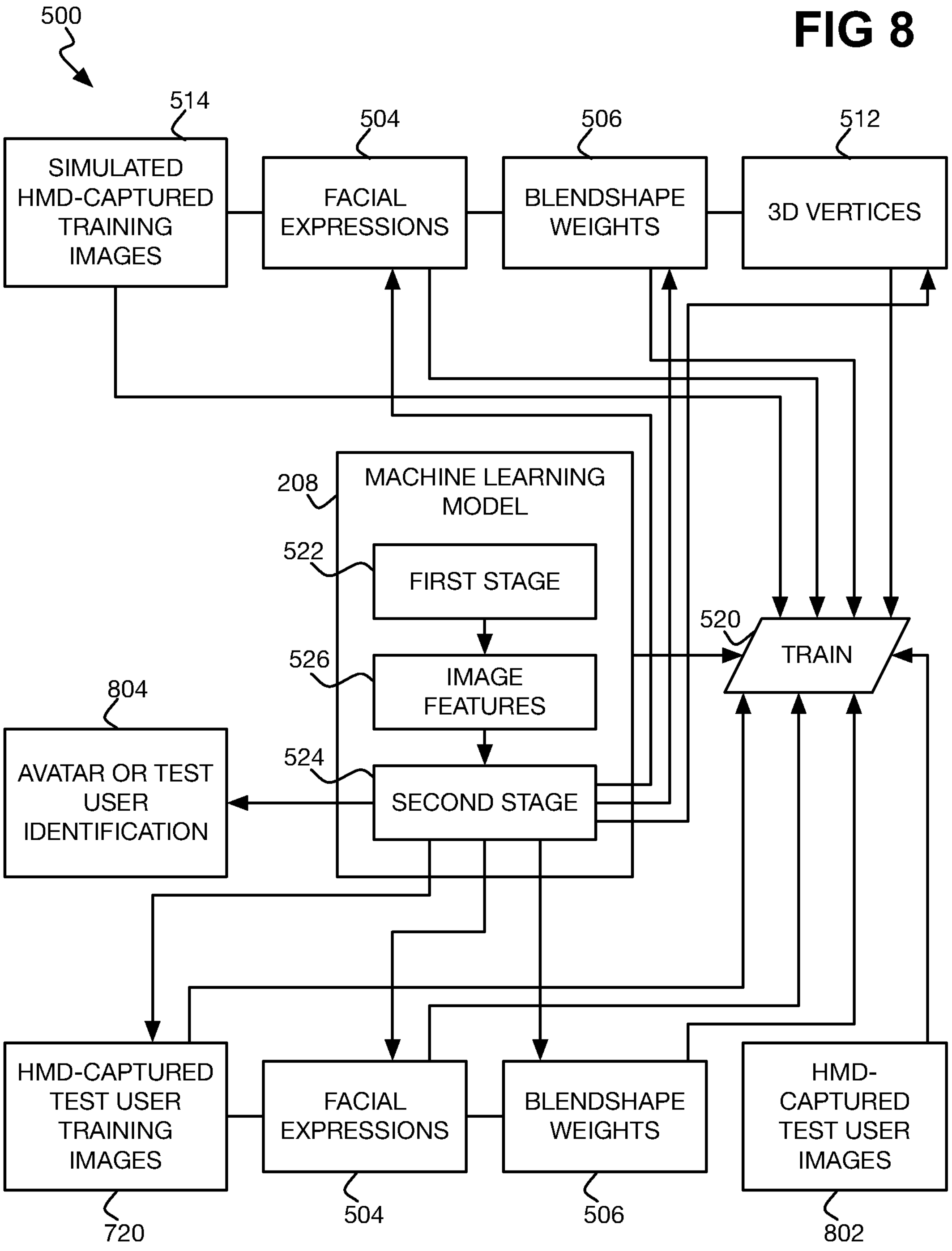
FIG. 8 is a diagram of the example machine learning model-training process of FIG. 5 or 7 in which the model is also training in an adversarial training manner to not distinguish between avatars and actual HMD wearers on the basis of image features extracted in the first stage of the model.

FIG. 8 shows the example process 500 as extended in such a manner. The machine learning model 208 is trained on the basis of simulated HMD-captured training images 514, facial expressions 504, blendshape weights 506, and/or 3D vertices 512 as in FIG. 5. The machine learning model 208 can also be trained on the basis of HMD-captured test user facial training images 720, facial expressions 504, and blendshape weights 506 as in FIG. 7. In addition to or in lieu of such test user facial training images 720, the machine learning model 208 can also be trained on additional HMD-captured test user facial training images 802.

The difference between the test user facial training images 720 and the test user facial training images 802 is that former have corresponding (i.e., specified, labeled, or otherwise known) facial expressions 504 and blendshape weights 506, whereas the latter do not. That is, the facial expressions of the test users within the facial training images 802 are at unknown or unspecified blendshape weights. The test user facial training images 802 can therefore be easily acquired, by having the HMDs capture the training images 802 while test users are wearing the HMDs.

The test user facial training images 802 are used solely to train the machine learning model 208 so that it does not distinguish between avatars and actual HMD wearers. The test user facial training images 720 can be used for this purpose, too, but are also used so that the model 208 accurately predicts blendshape weights 506 and facial expressions 504 (if known), as in FIG. 7. Whereas the training images 720 are used to train the second stage 524 of the machine learning model 208 to predict facial expression 504 and blendshape weights 506, the training images 802 are not.

Therefore, the machine learning model 208 is trained (520) to predict facial expressions 504, blendshape weights 506, and 3D vertices 512 from the training images 514 and 720 as in FIG. 5 or 7. That is, the first stage 522 of the model 208 is trained to extract image features 526 on which basis the second stage 524 can accurately predict facial expressions 504, blendshape weights 506, and 3D vertices 512 from the training images 514 and 720. However, the machine learning model 208 is also trained so that it is unable to predict identification 804 of whether each image 514, 720, or image 802 is of an avatar or a test user, using an adversarial training technique.

For instance, the second stage 524 may have a head module that predicts the identification 804 that an input image 514, 720, or 802 is of an avatar or a test user by outputting a probability that the input image in question is of an avatar or is of a test user. However, unlike the prediction of facial expression 504, blendshape weights 506, and 3D vertices 512, for which the first and second stages 522 and 524 of the machine learning model 208 are trained to accurately provide, the model 208 is trained so that it cannot predict whether a given training image 514, 720, or 802 is of a facial avatar or is of a test user by more than a threshold. That is, the machine learning model 208 is trained so that the model 208 cannot distinguish that the training images 510 are of avatars and that the training images 720 and/or 802 are of actual test users.

In this respect, the first stage 522 of the machine learning model 208 may be trained so that it extracts image features 526 on which basis the second stage 524 cannot provide accurate identification 804 of whether training images 514, 720, and 802 or of avatars or actual test users. Training the machine learning model 208 so that the first stage 522 extracts image features 526 in this way provides for a more robustly trained model 208. For example, if the HMD-captured test user training images 720 are not present, the fact that the model 208 has been trained to predict facial expression 504, blendshape weights 506, and 3D vertices 512 using just avatar training images 514 can still result in an accurate model 208, since the model 208 is unable to distinguish whether a training image 514 or 802 includes an avatar or an actual test user.

Figure 9:
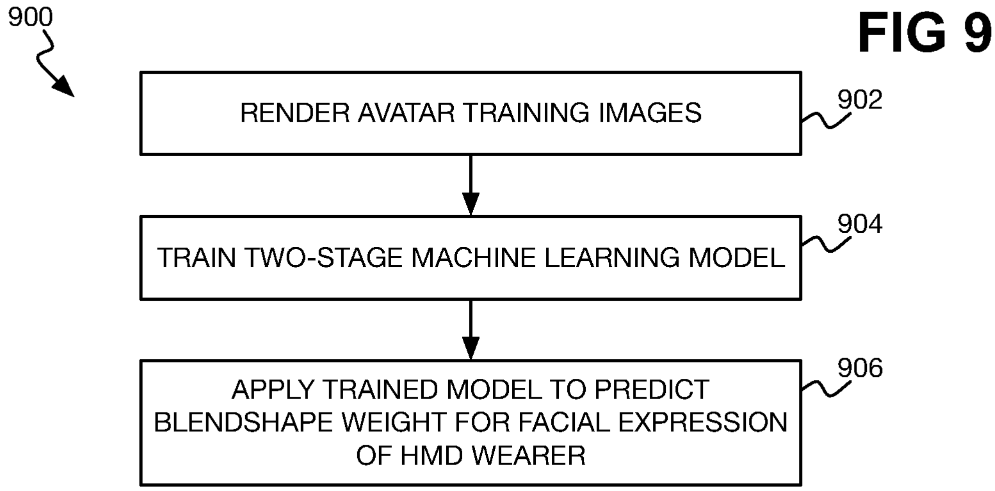
FIG. 9 is a flowchart of an example method.

FIG. 9 shows an example method 900. The method 900 may be implemented as program code stored on a non-transitory computer-readable data storage medium and executed by a processor. The processor may be that of the HMD 100, in which case the HMD 100 performs the method 900, or it may be that of a host device to which the HMD 100 is communicatively connected, in which case the host device performs the method 900. The method 900 includes rendering avatar training images 510 of facial avatars 502 having facial expressions 504 corresponding to specified blendshape weights 506 (902).

The method 900 further includes training a two-stage machine learning model 208 based on the rendered avatar training images 510 and the specified blendshape weights 506 (904). The machine learning model 208 has a first stage 522 extracting image features 526 from the rendered avatar training images 510 (e.g., the simulated HMD-captured avatar training images 514) and a second stage 524 predicting blendshape weights 506 from the extracted image features 526. The method 900 includes applying the trained machine learning model 208 to predict the blendshape weights 210 for a facial expression 202 of a wearer 102 of the HMD 100 from a set of images 206 captured by the HMD 100 of the face 104 of the wearer 102 when exhibiting the facial expression 202 (906).

Figure 10:
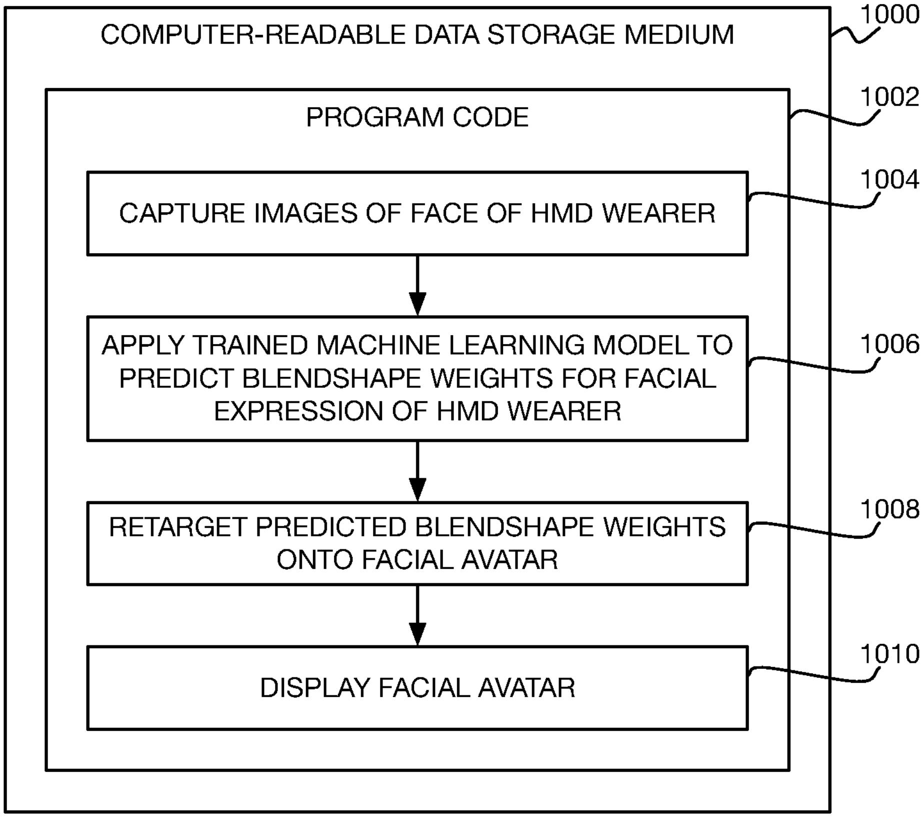
FIG. 10 is a diagram of an example non-transitory computer-readable data storage medium.

FIG. 10 shows an example non-transitory computer-readable data storage medium 1000 storing program code 1002 executable by a processor to perform processing. As in FIG. 9, the processor may be that of the HMD 100, in which case the HMD 100 performs the processing, or it may be that of a host device to which the HMD 100 is communicatively connected, in which case the host device performs the processing. The processing includes capturing a set of images 206 of a face 104 of a wearer 102 of the HMD 100 using one or multiple cameras 108 of the HMD 100 (1004). The processing includes applying a machine learning model 208 (trained on rendered avatar training images 510 of facial avatars 502 having facial expressions 504 corresponding to specified blendshape weights 506) to the captured set of images 206 to predict blendshape weights 210 for a facial expression 202 of the wearer 102 of the HMD 100 exhibited within the captured set of images 206 (1006).

The processing includes retargeting the predicted blendshape weights 210 for the facial expression 202 of the wearer 102 of the HMD 100 onto a facial avatar 230 corresponding to the face 104 of the wearer 102 to render the facial avatar 230 with the facial expression 202 of the wearer 102 (1008). The processing includes displaying the rendered facial avatar 230 corresponding to the face 104 of the wearer 102 (1010). For example, such displaying can include transmitting the rendered facial avatar 230 to HMDs worn by other users that are participating in the same XR environment as the wearer 102 of the HMD 100.

Figure 11:
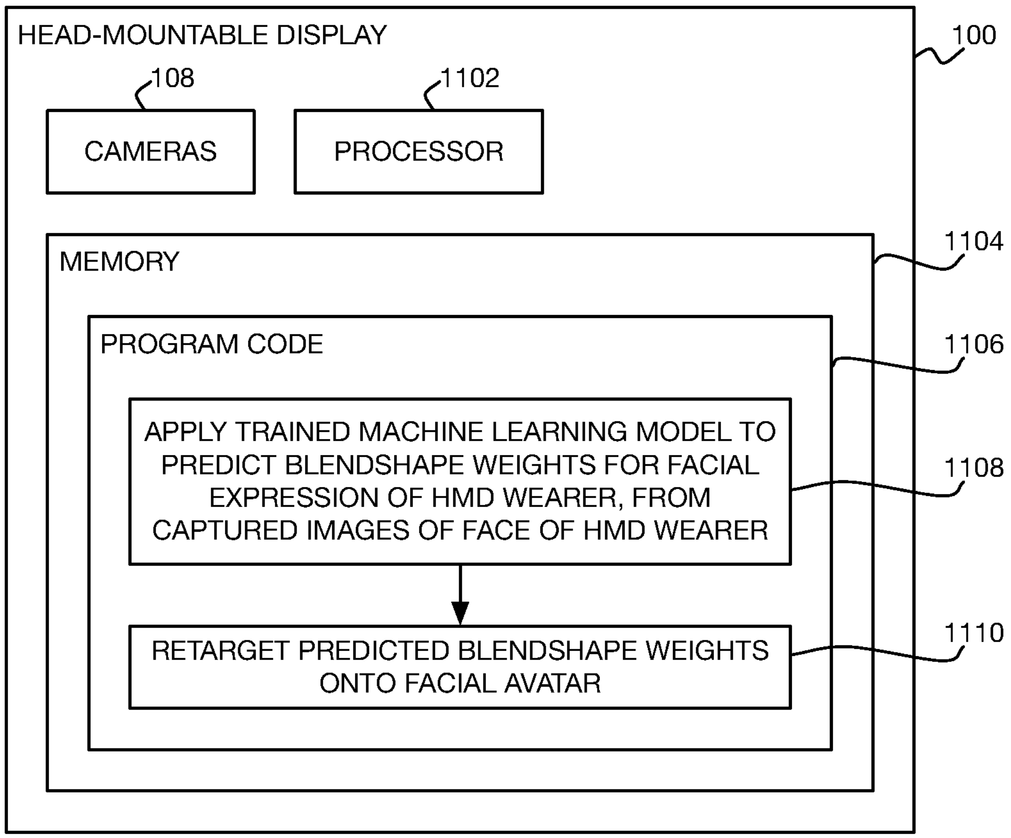
FIG. 11 is a block diagram of an example HMD.

FIG. 11 shows the example HMD 100. The HMD 100 includes one or multiple cameras 108 to capture a set of images 206 of a face 104 of a wearer 102 of the HMD 100. The HMD 100 includes a processor 1102 and a memory 1104, which can be a non-transitory computer-readable data storage medium, storing program code 1106 executable by the processor 1102. The processor 1102 and the memory 1104 may be integrated within an application-specific integrated circuit (ASIC) in the case in which the processor 1102 is a special-purpose processor. The processor 1102 may instead be a general-purpose processor, such as a central processing unit (CPU), in which case the memory 1104 may be a separate semiconductor or other type of volatile or non-volatile memory 1104. The HMD 100 may include other components as well, such as the display panel 106, various sensors, and so on.

The program code 1106 is executable by the processor 1102 to apply a machine learning model 208 (trained on rendered avatar training images 510 of facial avatars 502 having facial expressions 504 corresponding to specified blendshape weights 506) to the captured set of images 206 (1108). Application of the machine learning model 208 to the captured set of images 206 predicts blendshape weights 210 for a facial expression 202 of the wearer 102 of the HMD 100 exhibited within the captured set of images 206. The program code 1106 is executable by the processor 1102 to retarget the predicted blendshape weights 210 for the facial expression 202 of the wearer 102 of the HMD 100 onto a facial avatar 230 corresponding to the face 104 of the wearer 102, to render the facial avatar 230 with the facial expression 202 of the wearer 102 (1110).

Techniques have been described for predicting blendshape weights for facial expressions of HMD wearers using a machine learning model. The machine learning model is specifically trained on rendered avatar training images. Such avatars are rendered based on specified blendshape weights so that the avatars have facial expressions at these specified blendshape weights. The blendshape weights are therefore known, permitting sufficient training data to be generated for training the model without having to manually label the training images with blendshape weights.

We claim:

1. A method comprising:

rendering avatar training images of facial avatars having facial expressions corresponding to specified blendshape weights;

training, by a processor, a two-stage machine learning model based on the rendered avatar training images and the specified blendshape weights, the machine learning model having a first stage extracting image features from the rendered avatar training images and a second stage predicting blendshape weights from the extracted image features; and applying the trained machine learning model to predict the blendshape weights for a facial expression of a wearer of a head-mountable display (HMD) from a set of images captured by the HMD of a face of the wearer when exhibiting the facial expression, wherein the facial avatars are each modeled as a plurality of three-dimensional (3D) vertices as a proxy for muscle and bone movement, and the machine learning model is further trained based on the 3D vertices of each of the facial avatars, and wherein the second stage further predicts 3D vertices from the extracted image features.

2. The method of claim 1, further comprising:

retargeting the predicted blendshape weights for the facial expression of the wearer of the HMD onto a facial avatar corresponding to the face of the wearer to render the facial avatar with the facial expression of the wearer; and displaying the rendered facial avatar corresponding to the face of the wearer.

3. The method of claim 1, wherein the set of images captured by the HMD of the face of the wearer comprises left and right eye images of facial portions of the wearer respectively including left and right eyes of the wearer and a mouth image of a lower facial portion of the wearer including a mouth of the wearer, the method further comprising:

for each avatar training image of a facial avatar having a facial expression, simulating left and right eye avatar training images in correspondence with the left and right eye images captured by the HMD and a mouth avatar training image in correspondence with the mouth image captured by the HMD, and wherein the machine learning model is trained using the left and right eye avatar training images and the mouth avatar training image simulated for each training image.

4. The method of claim 1, further comprising:

generating an avatar animation video from the rendered avatar training images to sequentially include facial avatars having the facial expressions corresponding to the specified blendshape weights;

displaying the avatar animation video to test users wearing HMDs;

requesting that the test users mimic the facial expressions of the facial avatars as the facial expressions are displayed within the avatar animation video to the test users; and as the facial expressions are displayed within the avatar animation video, capturing test user facial training images of the test users having the facial expressions corresponding to the specified blendshape weights, by the HMDs of the test users, wherein the machine learning model is further trained based on the captured test user facial training images and the specified blendshape weights to which the facial expressions of the test users correspond.

5. The method of claim 4, wherein capturing the test user facial training images comprises:

as each facial expression is displayed within the avatar animation video, capturing for each test user left and right eye test user training images of facial portions of the test user respectively including left and right eyes of the test user and a mouth test user training image of a lower facial portion of the test user including a mouth of the test user, and wherein the machine learning model is trained using the left and right eye test user training images and the mouth test user training image captured for each test user for each facial expression.

6. The method of claim 1, further comprising:

capturing test user facial training images of test users wearing HMDs, wherein the first stage of the machine learning model is trained to extract the image features from both the rendered avatar training images and the captured test user facial training images in an adversarial training manner such that whether a given training image is of a facial avatar or of a test user cannot be predicted by more than a threshold from the extracted image features.

7. The method of claim 6, wherein the test users have facial expressions within the captured test user facial training images at unknown or unspecified blendshape weights, such that the second stage of the machine learning model is not trained based on the captured test user facial training images.

8. The method of claim 1, wherein the machine learning model is further trained based on the facial expressions of the facial avatars, and wherein the second stage further predicts the facial expressions from the extracted image features.

9. A non-transitory computer-readable data storage medium storing program code executable by a processor to perform processing comprising:

capturing a set of images of a face of a wearer of a head-mountable display (HMD) using one or multiple cameras of the HMD;

applying a machine learning model trained on rendered avatar training images of facial avatars having facial expressions corresponding to specified blendshape weights to the captured set of images to predict blendshape weights for a facial expression of the wearer of the HMD exhibited within the captured set of images;

applying natural facial expression constraints to the predicted blendshape weights to ensure that the predicted blendshape weights do not correspond to an unnatural facial expression unlikely to be exhibitable by the wearer;

retargeting the predicted blendshape weights for the facial expression of the wearer of the HMD onto a facial avatar corresponding to the face of the wearer to render the facial avatar with the facial expression of the wearer; and displaying the rendered facial avatar corresponding to the face of the wearer.

10. The non-transitory computer-readable data storage medium of claim 9, wherein the captured set of images of the face of the wearer comprises left and right eye images of facial portions of the wearer respectively including left and right eyes of the wearer and a mouth image of a lower facial portion of the wearer including a mouth of the wearer.

11. The non-transitory computer-readable data storage medium of claim 9, wherein the set of images of the face of the wearer of the HMD are captured, the machine learning model is applied to the captured set of images to predict the blendshape weights, the predicted blendshape weights are retargeted onto the facial avatar to render the facial avatar, and the rendered facial avatar is displayed continuously over time, and wherein each of a plurality of times the blendshape weights are predicted, the processing further comprises, prior to retargeting the predicted blendshape weights for the facial expression of the wearer of the HMD onto the facial avatar corresponding to the face of the wearer:

applying temporal consistency constraints to the predicted blendshape weights as currently predicted in comparison to as previously predicted to ensure that the predicted blendshape weights do not correspond to an unnatural change in facial expression unlikely to be exhibitable by the wearer.

12. A head-mountable display (HMD) comprising:

one or multiple cameras to capture a set of images of a face of a wearer of the HMD;

a processor; and a memory storing program code executable by the processor to:

apply a machine learning model trained on rendered avatar training images of facial avatars having facial expressions corresponding to specified blendshape weights to the captured set of images to predict blendshape weights for a facial expression of the wearer of the HMD exhibited within the captured set of images;

apply natural facial expression constraints to the predicted blendshape weights to ensure that the predicted blendshape weights do not correspond to an unnatural facial expression unlikely to be exhibitable by the wearer; and retarget the predicted blendshape weights for the facial expression of the wearer of the HMD onto a facial avatar corresponding to the face of the wearer to render the facial avatar with the facial expression of the wearer.

13. The HMD of claim 12, wherein the set of images of the face of the wearer of the HMD are captured, the machine learning model is applied to the captured set of images to predict the blendshape weights, and the predicted blendshape weights are retargeted onto the facial avatar to render the facial avatar continuously over time, and wherein each of a plurality of times the blendshape weights are predicted, the program code is further executable by the processor to, prior to retargeting the predicted blendshape weights for the facial expression of the wearer of the HMD onto the facial avatar corresponding to the face of the wearer:

apply temporal consistency constraints to the predicted blendshape weights as currently predicted in comparison to as previously predicted to ensure that the predicted blendshape weights do not correspond to an unnatural change in facial expression unlikely to be exhibitable by the wearer.

14. The method of claim 2, further comprising:

prior to retargeting the predicted blendshape weights for the facial expression of the wearer of the HMD onto the facial avatar corresponding to the face of the wearer, applying natural facial expression constraints to the predicted blendshape weights to ensure that the predicted blendshape weights do not correspond to an unnatural facial expression unlikely to be exhibitable by the wearer.

15. The method of claim 2, further comprising:

prior to retargeting the predicted blendshape weights for the facial expression of the wearer of the HMD onto the facial avatar corresponding to the face of the wearer, applying temporal consistency constraints to the predicted blendshape weights as currently predicted in comparison to as previously predicted to ensure that the predicted blendshape weights do not correspond to an unnatural change in facial expression unlikely to be exhibitable by the wearer.

16. The non-transitory computer-readable data storage medium of claim 9, wherein the machine learning model is further trained based on the facial expressions of the facial avatars.

17. The non-transitory computer-readable data storage medium of claim 9, wherein the facial avatars are each modeled as a plurality of three-dimensional (3D) vertices as a proxy for muscle and bone movement, and the machine learning model is further trained based on the 3D vertices of each of the facial avatars.

18. The HMD of claim 12, wherein the captured set of images of the face of the wearer comprises left and right eye images of facial portions of the wearer respectively including left and right eyes of the wearer and a mouth image of a lower facial portion of the wearer including a mouth of the wearer.

19. The HMD of claim 12, wherein the machine learning model is further trained based on the facial expressions of the facial avatars.

20. The HMD of claim 12, wherein the facial avatars are each modeled as a plurality of three-dimensional (3D) vertices as a proxy for muscle and bone movement, and the machine learning model is further trained based on the 3D vertices of each of the facial avatars.

* * * * *